Aug. 9, 1966 R. C. MAIER 3,265,115
VERTICAL CYLINDRICAL FILM EVAPORATOR WITH SELF-ROTATABLE WIPER
Filed June 1, 1964 2 Sheets-Sheet 1
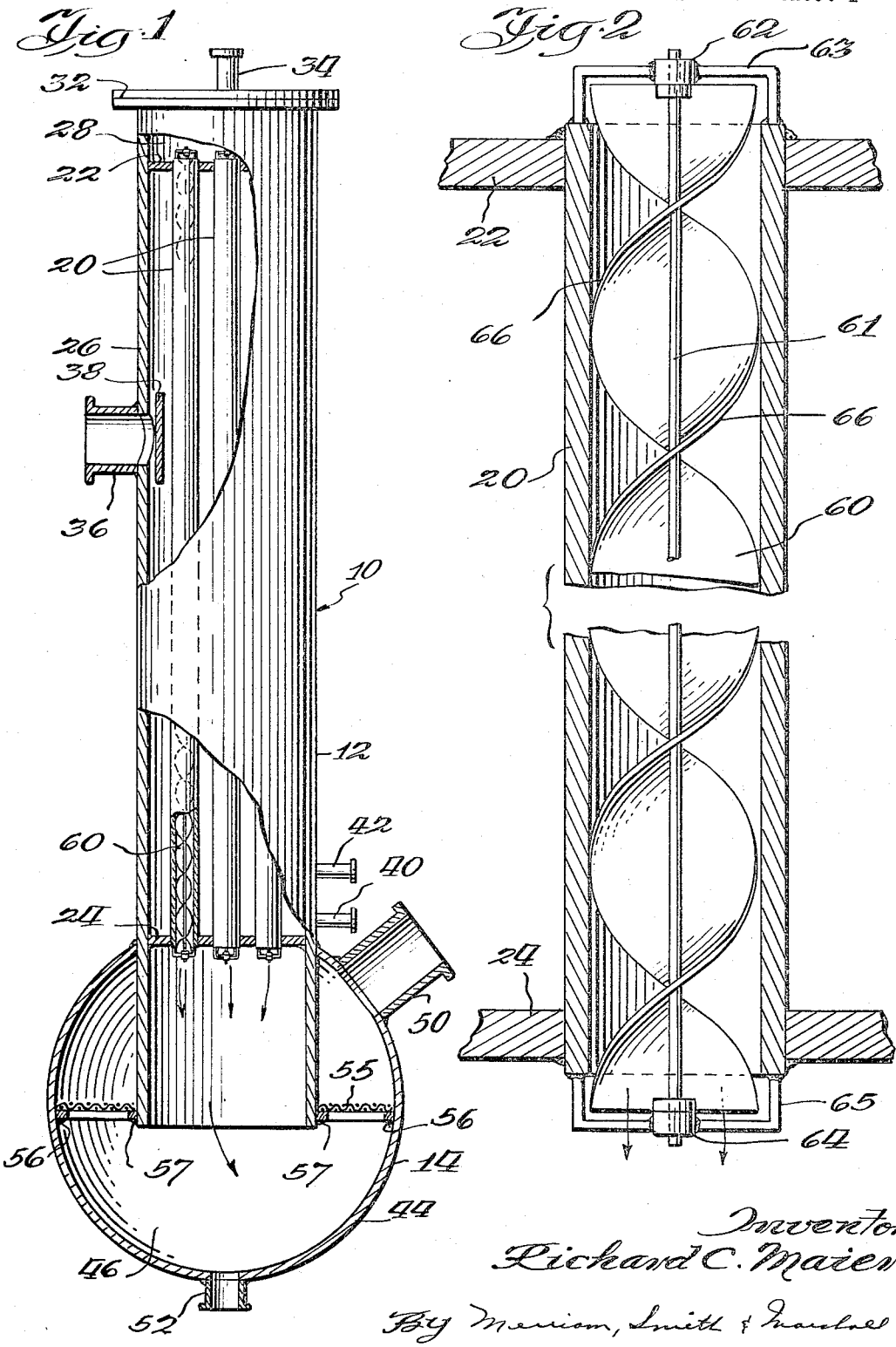
Inventor
Richard C. Maier
By Merriam, Smith & Marshall
Attorney

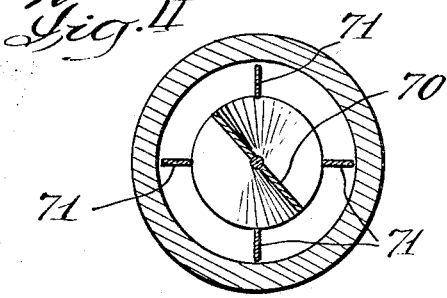
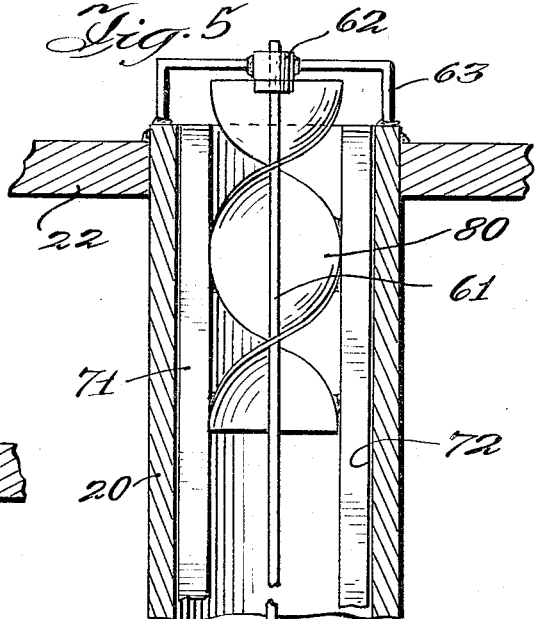
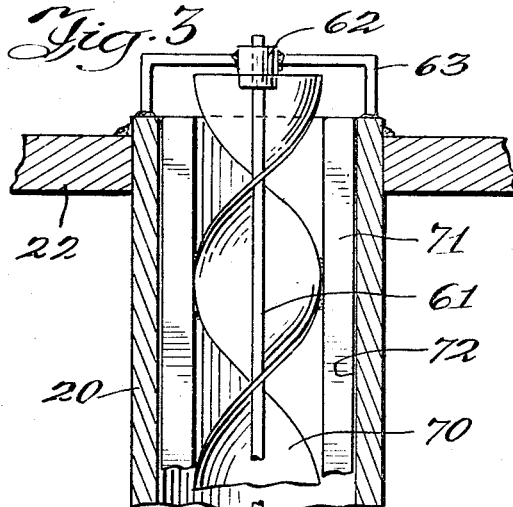
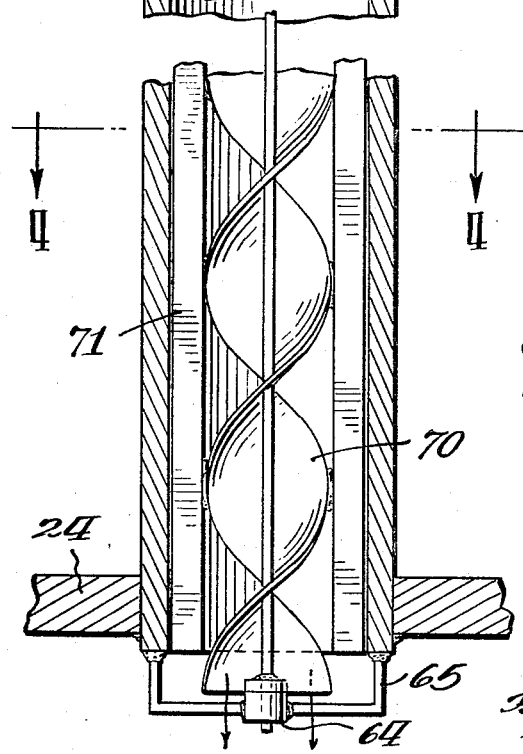

United States Patent Office 3,265,115
Patented August 9, 1966

3,265,115
VERTICAL CYLINDRICAL FILM EVAPORATOR WITH SELF-ROTATABLE WIPER
Richard Charles Maier, Chicago, Ill., assignor to Chicago Bridge & Iron Company, Oak Brook, Ill., a corporation of Illinois
Filed June 1, 1964, Ser. No. 371,646
4 Claims. (Cl. 159—13)

This invention relates to processing equipment. More particularly this invention is concerned with improvements in liquid film processing equipment.

There are various film processor vessels used industrially, one class of which are evaporators. Evaporators are specialized heat exchangers designed for the evaporation of solvents or for the concentration of solutions. They are unfired heat exchangers which transfer the latent or sensible heat of one fluid, the heating medium, into the latent heat of vaporization and/or sensible heat of another fluid, the solution to be concentrated. The solution to be concentrated flows across a heating surface which separates it from the heating medium and indirect heat exchange takes place between the heating medium and the solution. The solvent is vaporized from the solution, and the vapors are separated from the concentrated or thick liquor.

Evaporators of both the rising and falling film types employ vertically arranged tubular heaters. They are designed to be supplied with fluid to be heated at one end and arranged to discharge heated fluid and vapor from the other end. A vapor disengaging vessel or vapor body is also provided at one end of the tubes to receive the effluent heated fluid. Vapor separates from the liquor thereby increasing its concentration and the vapor and liquor are removed from the vessel in separate streams.

The extent of the vaporization achieved in the evaporator is dependent to a large extent upon the thickness of the rising or falling film on the inner surface of the tubes of the evaporator. Often the film becomes undesirably thick and as a result efficiency decreases. Furthermore, when the film is excessively thin it is rapidly evaporated and as a result sections of the evaporator tubes are not continually vaporizing liquid. It is therefore advisable that the film on the inner tube surfaces be controlled so that the evaporator efficiency might be increased.

Film processor vessels of the wetted wall column and contactor type are also used in mass transfer operations. For example, HCl gas can be passed concurrently or countercurrently to an absorbent film on the wall of a column. Mass transfer takes place from the gas to the liquid stream with heat transfer (cooling) occurring between the absorbent liquid on the column wall and a cooling medium external to the column.

According to the present invention there are provided improvements in apparatus utilizing a liquid film to control the thickness of the film such as a film being evaporated on the inner tube surfaces present in evaporators. This apparatus in a broad aspect comprises wiping means which is in close proximity to the tube or column inner surfaces and which wiping means rotates therein, thereby removing and/or evenly distributing liquid so that as a result the film on the surface is of a controlled thickness. In order to achieve rotation of the wiping means, it is associated with screw means that is rotated by the force of generated vapor flowing in the tube or column. Through rotation of the screw means there is achieved rotation of the wiping means and so long as the vessel is in operation the film on the inner surface is controlled and maintained within a predetermined thickness.

The invention will now be described further, with particular reference to evaporators, in connection with the accompanying drawings illustrating specific embodiments of the invention, wherein like parts are identified by like reference symbols in each of the views, and wherein:

FIGURE 1 is an elevational view, partly sectional and partly broken away, of one type of evaporator in which the subject invention can be employed;

FIGURE 2 is an enlarged vertical, partly sectional view of an evaporator tube showing helical screw means therein;

FIGURE 3 is also a vertical, partly sectional view of an evaporator tube showing helical screw means therein having separate wiping blades positioned longitudinally at the periphery of the screw;

FIGURE 4 is a sectional view at the line 4—4 in FIGURE 3; and

FIGURE 5 is a vertical, partly sectional view of an evaporator tube showing helical screw means therein which is positioned at the inner ends of the evaporator tube with wiping means positioned longitudinally at the periphery of the screw means.

Referring to FIG. 1, there is shown a long tube vertical falling film evaporator 10, such as of a natural circulation type. The evaporator includes a vertically-oriented preferably steam-heated tubular heater 12 mounted on a vapor disengaging vessel or vapor body 14 contiguously superimposed in end abutting relation thereto. The disengaging vessel is arranged at the lower end of the heater to receive the effluent heated fluid for separating the vaporous and liquid components of the fluid. Tubes 20 are arranged vertically in the heater 12 in spaced parallel relation. Tube sheets 22 and 24 have a plurality of openings for receiving the ends of tubes 20. The tubes are encased in a vertically extending elongated cylindrical tubular jacket or shell 26. Feed liquor distribution chamber 28 communicates with the interior of the tubes 20. A feed inlet pipe 34 is joined to the cover 32 and communicates with chamber 28. The liquor descends in the tubes 20, normally in films on the internal wall surfaces of the tubes.

Inlet pipe 36 permits feeding of the heating fluid into the jacket with its distribution being around baffle 38. Outlet pipe 40 is for condensate while the non-condensed gases vent through pipe 42. The heat transfer in the heater 12 causes vaporization of vaporizable components of the fluid composition descending into tubes 20, so that a two-phase mixture of vapor and liquid issues from the tubes at their lower end, and is discharged into the disengaging vessel 14.

An upper vapor outlet pipe 50 is mounted on wall 44 in communication with the disengaging chamber 46. A lower liquor outlet pipe 52 is mounted on the bottom of wall 44 and annular wire mesh pad entrainment separator 55 of conventional construction is mounted to extend horizontally across the upward flow path leading to the vapor outlet 50. The separator is supported by suitable means such as rings 56 and 57.

Positioned in at least one, and advisably all, of the evaporator tubes 20, according to one embodiment of the invention, is an elongated helical screw means 60 as is more clearly shown in FIG. 2. The screw means 60 is of a helical structure such as is formed by axially twisting an elongated strip of comparatively thin yet self-supporting metal strip. To stiffen the helical screw so produced a rod 61 can be positioned through the longitudinal axis of the helical screw and supported at appropriate positions by suitable bearing means. Thus, in FIG. 2 the rod 61 is supported at the top by bearing 62 which is held in position by bracket means 63 extending out from the upper end of the tube. The lower end of the rod 61 is supported in bearing means 64 which is held in position by bracket means 65. The brackets 63 and 65 are so constructed as to minimize obstruction of the ends of the evaporator tube so that the liquid and vapors can move therethrough with a minimum of obstruction. Although FIG. 2 shows the bearing means 62 and 64 extending beyond the ends of the evaporator tube, it is obvious that such bearings could be placed internally of the evaporator tube at any locations desired. Furthermore while the helical screw means shown in FIG. 2 extends the full length of the evaporator tube, it is clear that the screw means can be made of any length considered advisable.

The helical screw 60 as shown in FIG. 2 has a diameter which is slightly less than the inner diameter of the evaporator tube so that upon rotation of the helical screw a wiping action is achieved between the edges 66 of the screw and the inner wall of the evaporator tube. Any appropriate clearance between the edges 66 and the inner wall of the evaporator tube can be employed giving due regard to the liquid to be passed into the evaporator. In some instances it would be advisable for the edges 66 to actually contact the inner wall surfaces lightly so that the film remaining on the evaporator tube will be extremely thin. The edges 66 could be serrated so that wiping at intermittent areas of the tube is effected. Furthermore, the edges 66 can be of the same or a different composition from that used for the screw means itself. Various plastic materials which can withstand the processing conditions could be fastened to the edges for achieving the actual wiping effect. Teflon is one such material that might be used on the edges 66.

FIG. 3 shows a helical screw means 70 which is shown to be formed by axially twisting an elongated thin metal strip into a helical or spiral form. The diameter of the resulting helical screw 70 is substantially less than that of the inner diameter of the evaporator tube 20. Positioned longitudinally on the helical screw 70 are wiping vanes 71. Although four vanes 71 are shown, particularly in the sectional view of FIG. 4, the invention provided herewith is operable with one such vane although obviously the wiping effect would not be as often as would be achieved with a larger number of vanes. The vanes 71 can be welded to the longitudinal edges of the helical screw 70 and made of dimensions such that the outer edges 72 of such vanes come into close proximity with the inner wall of the evaporator tube 20. The resulting structure provides helical screw means 70 which is rotatably operable by vapor passing through the tube in either direction. As the structure rotates the edges 72 of vanes 71 effect the desired wiping of the internal evaporator tube surfaces. Bearing and support means can be provided as shown in the drawing and has been more fully described in regard to FIG. 2.

With reference to FIG. 5, the wiping means, as provided there, has helical screw means 80 at the top and similar screw means 81 at the bottom of the evaporator tube. Attached to the periphery of such screw means are longitudinal wiping vanes 71 like those described and shown in FIG. 3. The screw means 80 and 81 achieve rotation of the vane 71 to achieve the desired wiping effect in evaporators in which the vapors move at a comparatively high velocity. In fact in those which have high velocity movement of vapors it is feasible to employ only a singular helical screw means either at the top or the bottom end of the evaporator tube. In other words, either screw means 80 or screw means 81 could be employed to achieve the desired rotation for achieving the wiping effect. Furthermore, it is within the scope of this invention to position an appropriate screw means at any location within the inner area of the evaporator tube in order to obtain rotation by means of the vapor passing therethrough. In addition, particularly in evaporators in which the vapor is moving at a high velocity, the screw means can be positioned externally of the evaporator tube so that rotation is achieved, such as for example, by placing the screw means just beyond the exit end of the evaporator tube. Such structure is feasible because the vapor velocity of the outlet end of the tube is greatest.

By utilizing the structures as described and their reasonable equivalents a uniformly thick film of liquid will be maintained on the inner tube wall surfaces. Liquid will be wiped from the areas where the film thickness is greater than the tolerance between the wiping means and the tube wall, and will be deposited by centrifugal force where the film thickness is smaller. The wiping means of this invention has the advantage in that it is self-sustaining and requires no external source other than the moving vapors to achieve the wiping action by means of the screw means operating in combination with the wiping means.

Although the above discussion of the drawings is specific to evaporators, the wiped-film apparatus is clearly useful in other vessels in which wetted wall columns are employed. In fact, the invention is applicable to all processing equipment which employs liquid films to facilitate absorption, condensation or evaporation.

Various changes and modifications of the invention can be made and, to the extent that such variations incorporate the spirit of this invention, they are intended to be included within the scope of the appended claims.

What is claimed is:

1. An evaporating processing vessel for concentrating liquids and thus generating vapors, having at least one vertical elongated tube, means for feeding a liquid to the upper end of the tube to gravitate downwardly as a film on the inner surface of the tube, rotatable wiping means positioned in the tube to wipe the surface of the tube and thereby control the thickness of liquid film thereon, said wiping means comprising rotatable helicoidal screw means, said screw means being freely pivotable for rotation by the falling vapor forces in the tube so that the wiping of said film is self-sustained by the processing of the liquid.

2. Apparatus according to claim 1 in which the helicoidal screw means is a thin strip elongated helix having peripheral edges which rotate in close proximity to the inner surface of the tube.

3. An evaporator for concentrating liquids and thereby generating vapors having at least one vertical elongated tube, means for feeding a liquid to one end of the tube to enable the liquid to be distributed towards the other tube end as a film on the inner surface of the tube, rotatable wiping means positioned in the tube to wipe the surface of the tube and thereby control the thickness of liquid film thereon, said wiping means comprising rotatable helicoidal screw means, said screw means being freely pivotable for rotation by the generated vapor forces moving through the tube away from the tube end to which liquid is fed so that the wiping of said film is self-sustained by the processing of the liquid.

4. An evaporator for concentrating liquids and thereby generating vapors, having at least one vertical elongated tube, means for feeding a liquid to the upper end of the tube to gravitate downwardly as a film on the inner surface of the tube, means for removing the vapor so formed from the tube, rotatable wiping means longitudinally positioned in close proximity to the evaporator tube inner surface to wipe said surface and thereby control the thickness of liquid film thereon to facilitate heat transfer and vaporization of the liquid, said wiping means comprising rotatable helicoidal screw means, and bearing means at the ends of said tube for supporting said screw means, said screw means being freely pivotable for rotation by the falling vapor forces in the tube so that the wiping of said film is self-sustained by the processing of the liquid.

References Cited by the Examiner

UNITED STATES PATENTS

| | | | |
|---|---|---|---|
| 1,164,413 | 12/1915 | Shaw | 159—13 |
| 1,668,577 | 5/1928 | Vecchio | 22—379 X |
| 2,003,742 | 6/1935 | Elliot | 122—17 |
| 2,492,333 | 12/1949 | Swindin | 159—25 X |
| 3,067,812 | 12/1962 | Latinen et al. | 159—6 |
| 3,190,817 | 6/1965 | Neugebauer et al. | 159—6 X |

FOREIGN PATENTS

| | | |
|---|---|---|
| 1,161,852 | 1/1964 | Germany. |
| 22,408 | 10/1907 | Great Britain. |
| 282,725 | 5/1952 | Switzerland. |

NORMAN YUDKOFF, *Primary Examiner.*

J. SOFER, *Assistant Examiner.*